N. C. CHRISTENSEN.
APPARATUS FOR SETTLING FINELY DIVIDED SOLIDS AND LIQUIDS OUT OF SUSPENSION IN GASES.
APPLICATION FILED MAR. 8, 1921.
1,434,090.
Patented Oct. 31, 1922.
2 SHEETS—SHEET 1.
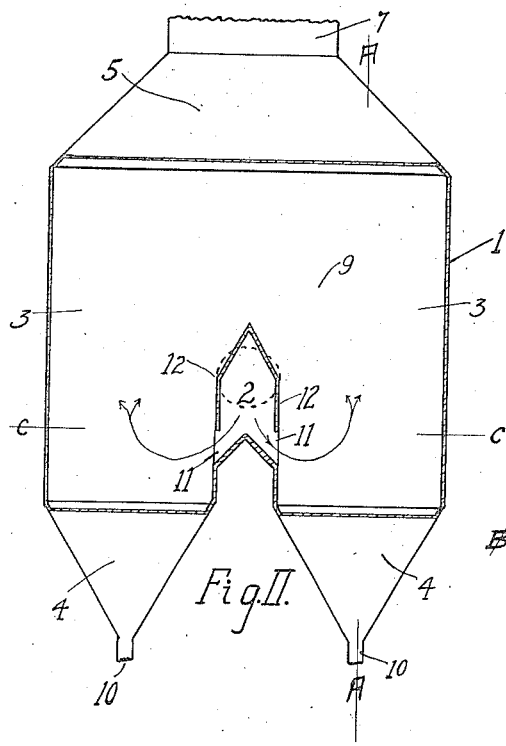
Fig. II.
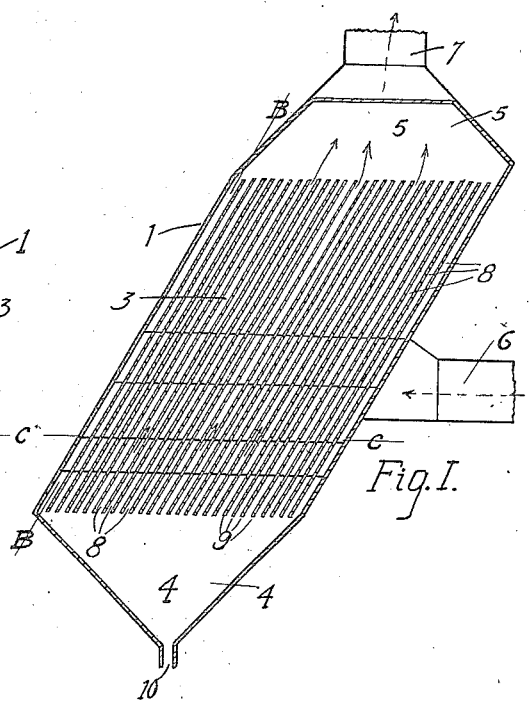
Fig. I.
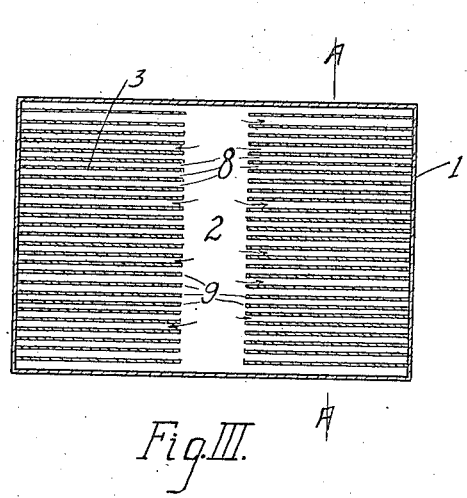
Fig. III.
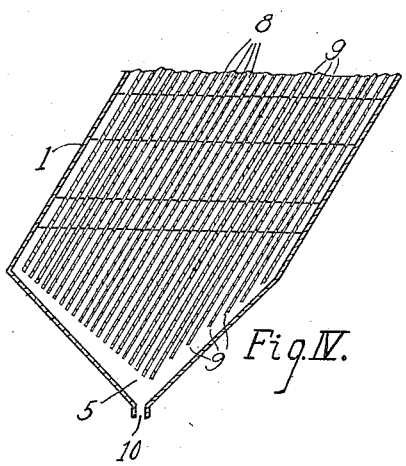
Fig. IV.
INVENTOR
Niels C. Christensen.

N. C. CHRISTENSEN.
APPARATUS FOR SETTLING FINELY DIVIDED SOLIDS AND LIQUIDS OUT OF SUSPENSION IN GASES.
APPLICATION FILED MAR. 8, 1921.
1,434,090.
Patented Oct. 31, 1922.
2 SHEETS—SHEET 2.
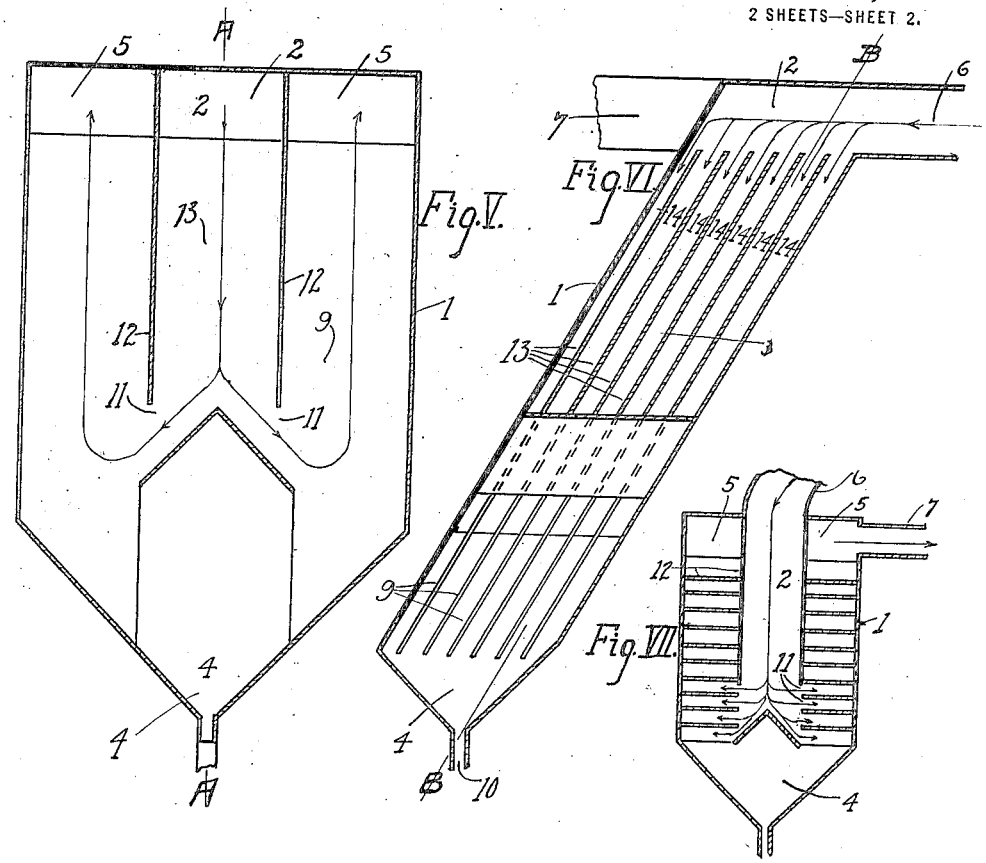
INVENTOR
Niels C. Christensen Patented Oct. 31, 1922.

1,434,090

UNITED STATES PATENT OFFICE.

NIELS C. CHRISTENSEN, OF SALT LAKE CITY, UTAH.

APPARATUS FOR SETTLING FINELY-DIVIDED SOLIDS AND LIQUIDS OUT OF SUSPENSION IN GASES.

Application filed March 8, 1921. Serial No. 450,680.

*To all whom it may concern:*

Be it known that I, NIELS C. CHRISTENSEN, a citizen of the United States, residing at Salt Lake City, in the county of Salt Lake and State of Utah, have invented certain new and useful Improvements in Apparatus for Settling Finely-Divided Solids and Liquids Out of Suspension in Gases; of which the following is a specification.

This invention relates to apparatus for settling finely divided solid particles out of suspension in gases. It is particularly applicable to the settlement and recovery of the fine particles of various solids from the air drawn through various machines in flour mills, grain elevators, feed grinding mills, cement plants, coal dust plants, and dry grinding mills of different kinds. The apparatus is applicable to the handling of such materials as are now recovered by means of cyclone dust collectors but will also recover the finer material from the air, or gases, which cannot be recovered with such apparatus. The invention is therefore applicable to the recovery of the finer solids which are now recovered by means of air or gas filters. It is also applicable to the settlement of finely divided liquids in suspension in gases.

My invention relies entirely upon the settlement of the fine particles out of the gases, and does not make use of any filtering medium, to recover these particles from their suspension in the gases.

I have found that practically all finely divided solids will settle very rapidly if the air in which they are suspended is kept still or flows in a uniform current without eddies and cross currents. I have also found that these solid particles may be separated from quiet or uniformly flowing gases most rapidly by reducing the distance which the particle has to settle before coming to rest upon a solid surface. I have also found that when such dry finely divided solid particles have been settled into a mass, that they are not easily disturbed and brought into suspension again by such currents as those from which they have been settled, and will flow in contact with such currents without being disturbed to any great extent.

It is the object of my invention to secure a uniform flow of gas over a very large settling surface in such a way that the solid particles will have but a relatively short distance to settle before coming to rest on a supporting surface, and to remove the material thus settled from the current of gas without allowing it to pass through the current so as to be again brought into suspension, and at the same time to secure a counterflow of settled solids and gases through the settling space so as to discharge all the settled material from the settling space as far as possible from the gas outflow so that any of the dust brought into suspension in being so discharged will not be carried away by the outflowing gases.

These objects are accomplished in my apparatus by dividing the path of the current of gas carrying the particles in suspension into a number of parallel sloping spaces by means of a number of parallel sloping surfaces. The current of gas is passed through these spaces in such a manner as to secure a uniform flow at a relatively low velocity so as to avoid eddy currents. The current of gas is also introduced into said spaces and allowed to flow out of said spaces in such a manner as to prevent any mixing of the gas with the settled particles which settled out upon the sloping settling surfaces and flow or slide down these out of the gas current, and the gases are forced to flow upward through the sloping settling spaces so as to be discharged from the upper ends of these spaces while the settled solids are discharged from the lower ends. This combination of a lateral inflow with the longitudinal counterflow of gases and settled solids is a feature of great importance in settling the lightest particles of solids and is a feature which constitutes a great improvement over the forms of dust settling apparatus now known to the art.

The manner in which this is accomplished will be made clear by reference to the drawings. Fig. 1 is a vertical section on the line A—A of Fig. 2. Fig. 2 is a sloping sectional elevation on line B—B of Fig. 1. Fig. 3 is a horizontal section on the line C—C. Fig. 4 is a vertical section on A—A showing an extended arrangement of the settling surfaces. Fig. 5 is a sloping sectional elevation on a line B—B of Fig. 6 parallel to the sloping surfaces showing an arrangement of the inflow space with settling surfaces. Fig. 6 is a vertical section on the center line A—A of Fig. 5. Fig. 7 is a vertical sectional view of a further modified form of the apparatus.

The apparatus consists of chamber (1) divided by suitable partitions in a general way into four kinds of spaces, the inflow and distributing space (2) the settling space (3), the discharge space (4) and the outflow space (5). The gas is brought into the distributing space (2) through the inflow pipe (6) and is discharged from the outflow space (5) through the outflow pipe (7). The settling space (3) is divided into a number of similar parallel sloping settling spaces (8) by the sloping partitions (9). The discharge space (4) is hoppered so that the settled material will flow to the discharge opening (10). The operation of the apparatus in general is as follows: The stream of gas carrying in suspension the particles to be settled flows into the inflow and distributing space (2) through the inflow pipe (6) and flows laterally out of the distributing space (2) through the openings (11), in the partition (12) separating the inflow and settling spaces, into the settling spaces (8) and up the slope through these settling spaces (8) to the outflow space (5). During the passage of the gases upward along the slope through the settling spaces (8) the particles in suspension settle out upon the upper surface of the settling partitions (9) and flow or slide down into the discharge space (4) from which it is discharged through the discharge spout or opening (10). It will be noticed that the arrangement of the various spaces is such that the settled particles are removed from the gas current without having to pass through the current. It will also be noticed that the arrangement of the spaces to accomplish this end may be varied somewhat. For example in the arrangement shown in Figs. 1, 2, 3 and 4, the inflow and distributing space (2) is relatively small and is placed near the lower part of the settling space (3), so that the gases enter through the inflow pipe (6) into the inflow and distributing space (2) and flow out laterally from the openings (11), in the partition (12) separating the inflow space (2) from the settling space (3), out into the settling spaces (8) and up the slope between the settling surfaces (9) into the outflow space (5) and out of the outflow pipe (7). During the passage of the gases through the settling spaces (8) the particles in suspension settle out upon the sloping surfaces (9) and flow or slide down into the discharge hopper (4). In Figs. 5 and 6 the arrangement is similar to that in Figs. 1, 2, 3 and 4 except that the inflow space (2) is made larger and extended upward and is supplied with settling surfaces (13) dividing part of the inflow space into settling spaces (14). In this arrangement the gases enter the upper part of the distributing space (2) through the inlet pipe (6) and flow down through the settling spaces (14) and laterally out through the opening (11), in the partition (12) separating the settling and inflow compartments, into the settling spaces (8) and up through these spaces along the slope to the outflow spaces (5) and out through the outflow pipes (7). The inflow pipe (6) and outflow pipes (7) are preferably on opposite sides of the apparatus as shown in order that the length of path of flow through the apparatus shall be the same through all the settling spaces. The action of the apparatus is similar to that described for Figs. 1, 2, 3 and 4. During the passage of the gases down through the settling spaces (14) and up through the settling spaces (8) the suspended particles settle out upon the partitions (13) and (9) and flow or slide down into the discharge hopper (5). A circular arrangement may also be used, a vertical section of which is shown in Fig. 7, but this is not the preferred form of my invention as the cost and difficulty of construction is somewhat increased as compared with the straight line types since the settling partitions should be bent to form spiral surfaces in this case. The operation of this form is the same as that described for Figs. 1 to 6 inclusive.

It will be apparent from the foregoing that various arrangements of the different parts of my apparatus may be used and that the shape and proportions of the different parts may be varied according to the different conditions. I do not therefore desire to be limited entirely by the foregoing descriptions and drawings but only by the claims.

Having described my invention what I claim and deire to patent is:

1. In an apparatus for settling fine particles out of suspension in gases, comprising, in combination, a settling chamber; a plurality of parallel sloping surfaces located therein and dividing said chamber into a number of similar and substantially parallel sloping settling spaces, said spaces opening at their upper ends into an outflow channel for discharging said gases; a hopper at the lower portion of the chamber for discharging the settled particles, said hopper being in communication with the lower ends of said settling spaces and said settling spaces being closed at their sides except near the lower portion thereof where they have lateral openings communicating with an inflow channel for supplying said mixture of gases and particles to be settled, whereby when a mixture of gases and particles is supplied to said inflow channel said mixture will flow through said lateral openings into the sloping settling spaces and longitudinally upward along the slope of said spaces, and the particles in suspension in the gas will settle upon the sloping surfaces and flow downward into the discharge hopper, the gases passing upward and being discharged through the outflow channel.

2. In a dust settling apparatus, the combination of a chamber; a plurality of parallel sloping settling surfaces mounted therein and producing substantially parallel sloping spaces; a discharge channel for the gases at the upper end of said spaces; a discharge hopper at the lower end of said spaces; and an inflow channel discharging into laterally disposed openings extending into the lower part of the settling spaces within the chamber.

3. In a dust settling apparatus, the combination of a chamber; a series of similar parallel sloping settling surfaces disposed therein and producing a plurality of substantially parallel sloping settling spaces; a discharge channel for the gases at the upper end of the chamber, said channel communicating with said spaces; a discharge hopper at the lower end of the channel and in communication with the lower end of said spaces; and an inflow channel for supplying the mixture of gases and particles to be settled, said channel communicating with the settling spaces through lateral openings formed in the chamber near the lower portion of said spaces, whereby when a mixture of gases and particles to be settled is supplied to the inflow channel, said mixture will flow through said lateral openings into the settling spaces and the gases will flow longitudinally upwardly through said sloping spaces and into said discharge channel, and the particles settling upon said settling surfaces will flow down along the slope thereof into the discharge hopper.

In testimony whereof I have signed my name to this specification.

NIELS C. CHRISTENSEN.